United States Patent
Xu et al.

(10) Patent No.: US 8,315,225 B2
(45) Date of Patent: Nov. 20, 2012

(54) ASPECTS TO SUPPORT LTE-A DOWNLINK HI-ORDER MIMO

(75) Inventors: Hua Xu, Ottawa (CA); Jianglei Ma, Kanata (CA); Dong-Sheng Yu, Ottawa (CA); Ming Jia, Ottawa (CA); Aaron Callard, Ottawa (CA); Mohammadhadi Baligh, Kanata (CA)

(73) Assignee: Research In Motion Limited, Waterloo, Ontario (CA)

( * ) Notice: Subject to any disclaimer, the term of this patent is extended or adjusted under 35 U.S.C. 154(b) by 380 days.

(21) Appl. No.: 13/068,836

(22) Filed: Sep. 21, 2009

(65) Prior Publication Data
US 2012/0087442 A1    Apr. 12, 2012

Related U.S. Application Data

(60) Provisional application No. 61/098,894, filed on Sep. 22, 2008.

(51) Int. Cl.
*H04W 72/00* (2009.01)
(52) U.S. Cl. .................................. 370/330; 370/478
(58) Field of Classification Search .............. 370/328, 370/329, 330, 478
See application file for complete search history.

(56) References Cited

U.S. PATENT DOCUMENTS

| | | | |
|---|---|---|---|
| 2010/0054161 A1* | 3/2010 | Montojo et al. | 370/280 |
| 2010/0075706 A1* | 3/2010 | Montojo et al. | 455/513 |
| 2010/0113041 A1* | 5/2010 | Bienas et al. | 455/450 |
| 2010/0173659 A1* | 7/2010 | Shin et al. | 455/500 |
| 2010/0195583 A1* | 8/2010 | Nory et al. | 370/329 |
| 2010/0240400 A1* | 9/2010 | Choi | 455/458 |
| 2011/0013730 A1* | 1/2011 | Mansson et al. | 375/340 |

OTHER PUBLICATIONS

3GPP TSG RAN1 #54, Jeju, Korea, Aug. 18-22, 2008, R1-083224, Agenda 12; Source: Motorola; Title: "Common Reference Symbol Mapping/Signaling for 8 Transmit Antenna."

* cited by examiner

*Primary Examiner* — Brian D Nguyen
(74) *Attorney, Agent, or Firm* — Finnegan, Henderson, Farabow, Garrett & Dunner, LLP

(57) ABSTRACT

A method of operation of a MIMO transmitter, in a cellular network supporting both legacy standard-compliant mobile terminals and next generation standard-compliant mobile terminals, the method comprising defining a matrix of resource blocks within an information channel of the cellular network, wherein each resource block corresponds to a region of subcarriers of a transmission timeslot at a given frequency subband; assigning a first set of reference signals (RSs) for the legacy standard-compliant mobile terminals to resource blocks at specific locations within the matrix to be transmitted by the MIMO transmitter, the specific locations being defined by, the legacy standard; and assigning a second set of RSs for the next-generation standard-compliant mobile terminals to other resource blocks within the matrix to be transmitted by the MIMO transmitter.

22 Claims, 15 Drawing Sheets

ASPECTS TO SUPPORT LTE-A DOWNLINK HI-ORDER MIMO

CROSS-REFERENCE TO RELATED APPLICATIONS

This application claims the benefit of priority from U.S. patent application Ser. No. 61/098,894 filed Sep. 22, 2008, the contents of which are hereby incorporated by reference.

TECHNICAL FIELD

This application relates to wireless communication techniques in general, and to a techniques of the present disclosure, in particular.

SUMMARY

Aspects and features of the present application will become apparent to those ordinarily skilled in the art upon review of the following description of specific embodiments of the disclosure in conjunction with the accompanying drawing figures and appendices.

BRIEF DESCRIPTION OF THE DRAWINGS

Embodiments of the present application will now be described, by way of example only, with reference to the accompanying drawing figures, wherein.

Figure 3:
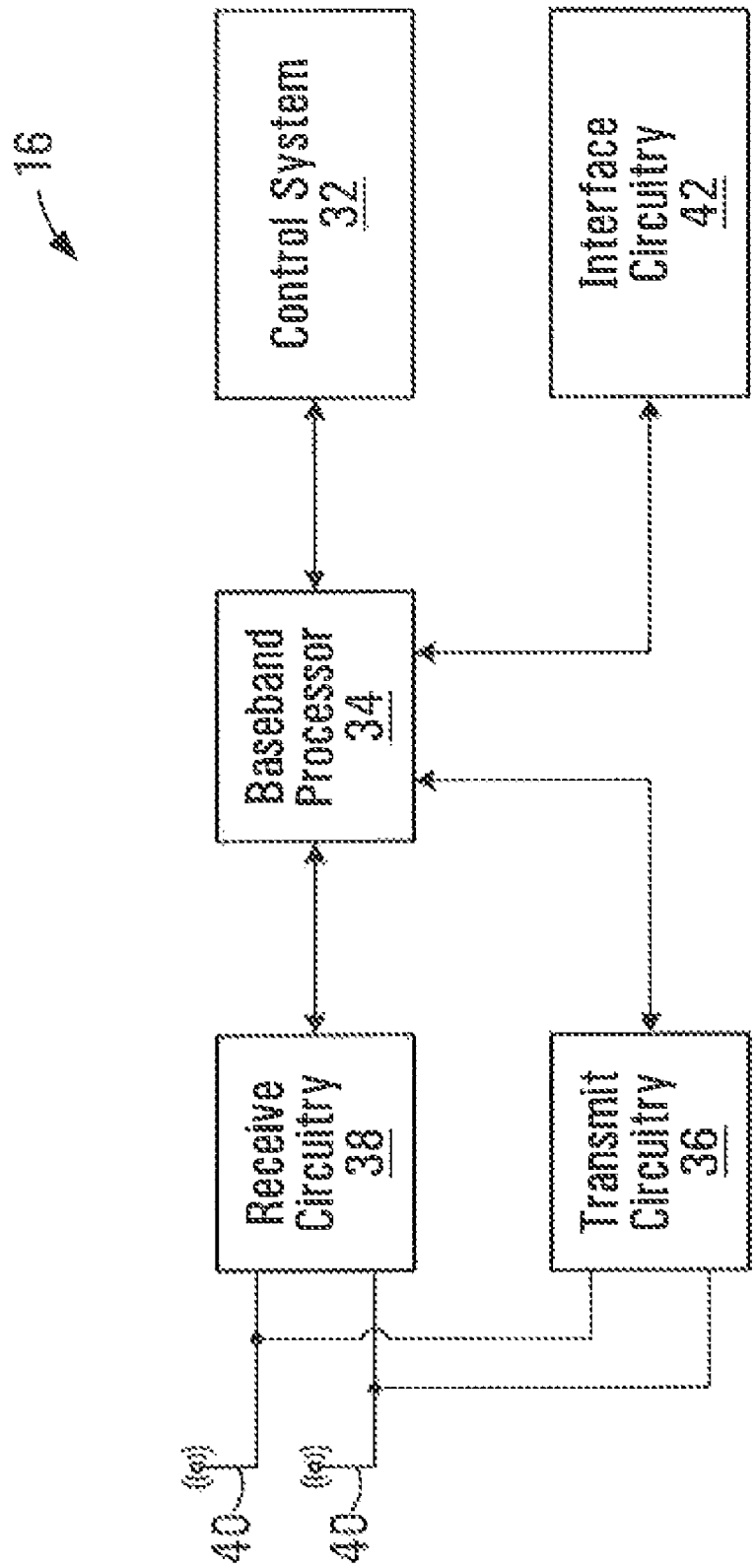
Figure 4:
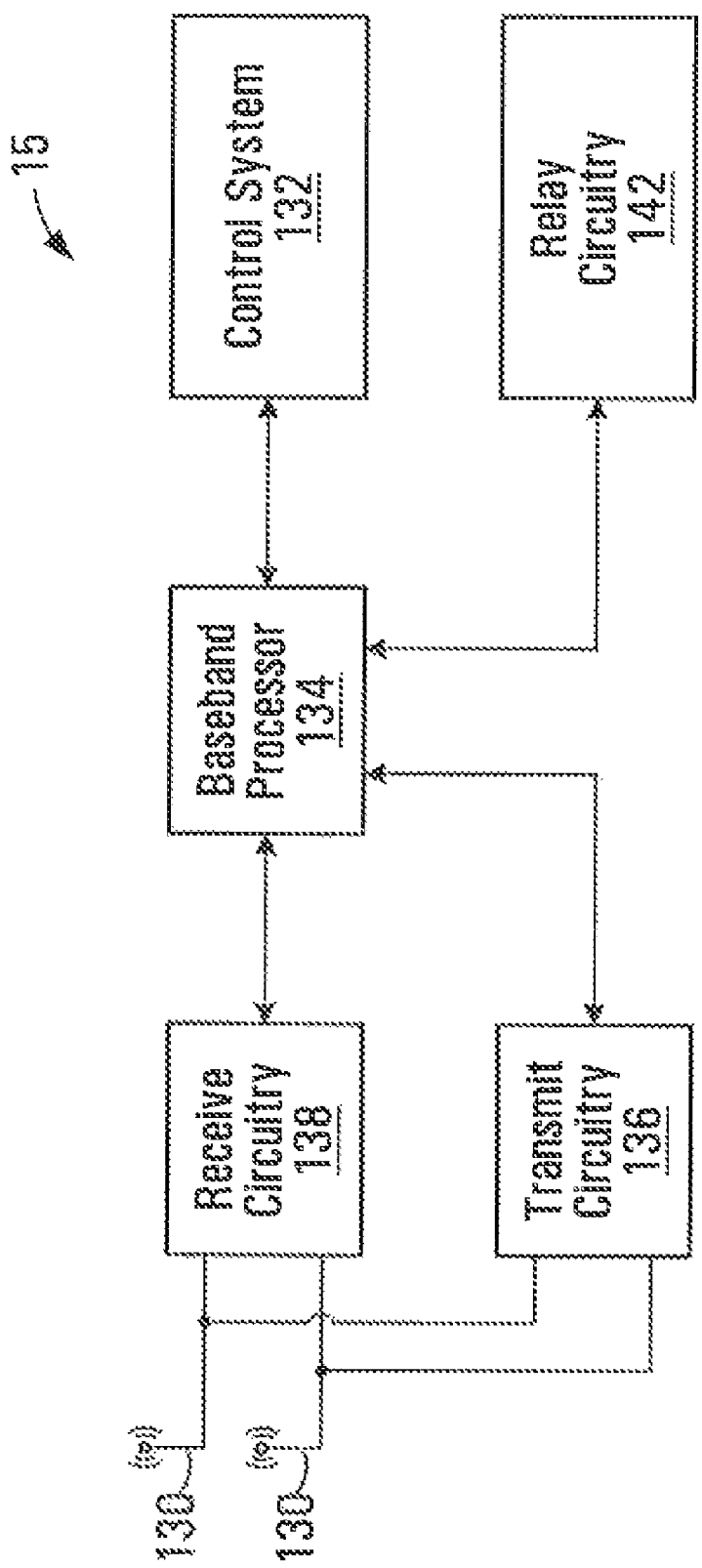
Figure 5:
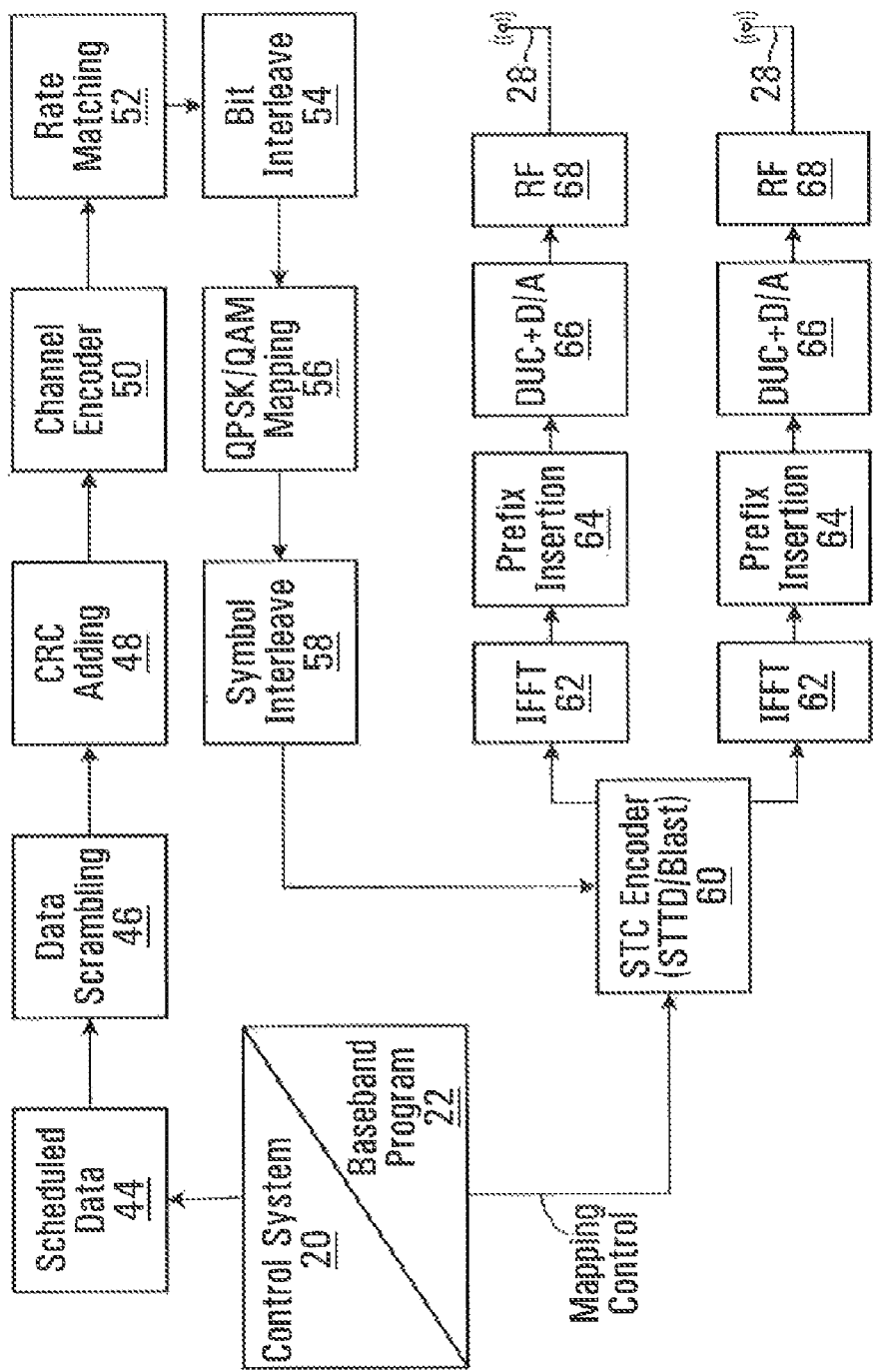
Figure 6:
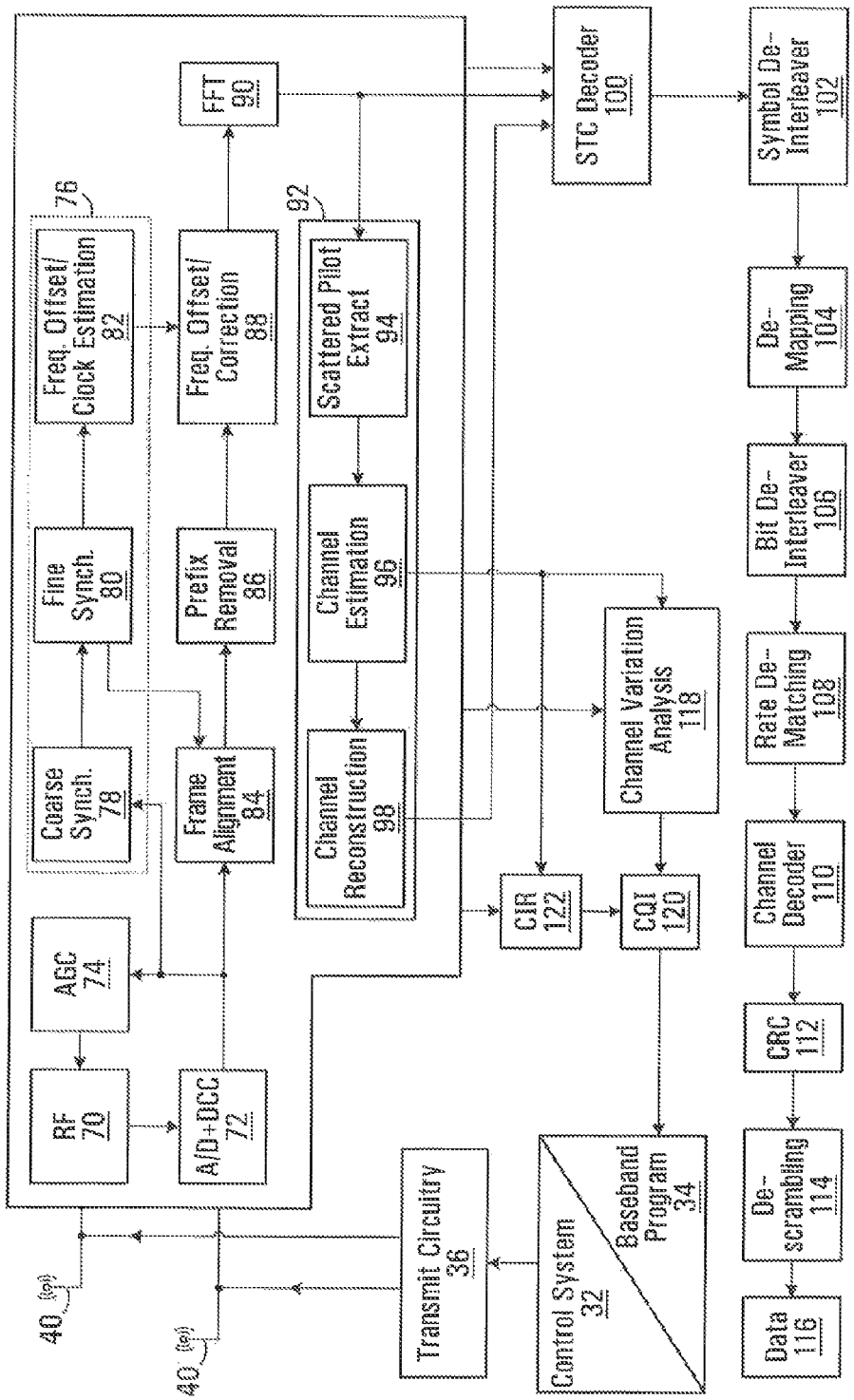
Figure 7A:
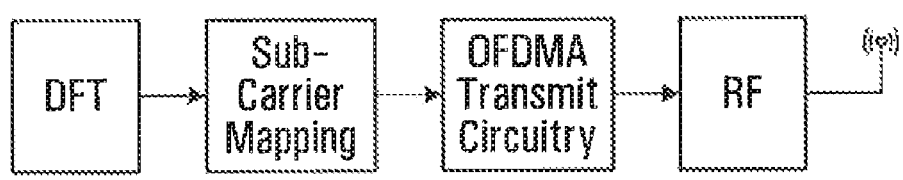
Figure 7B:
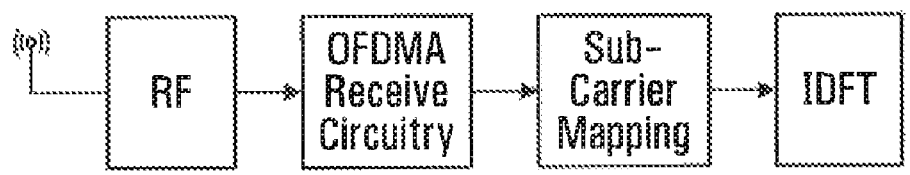
Figure 8A:
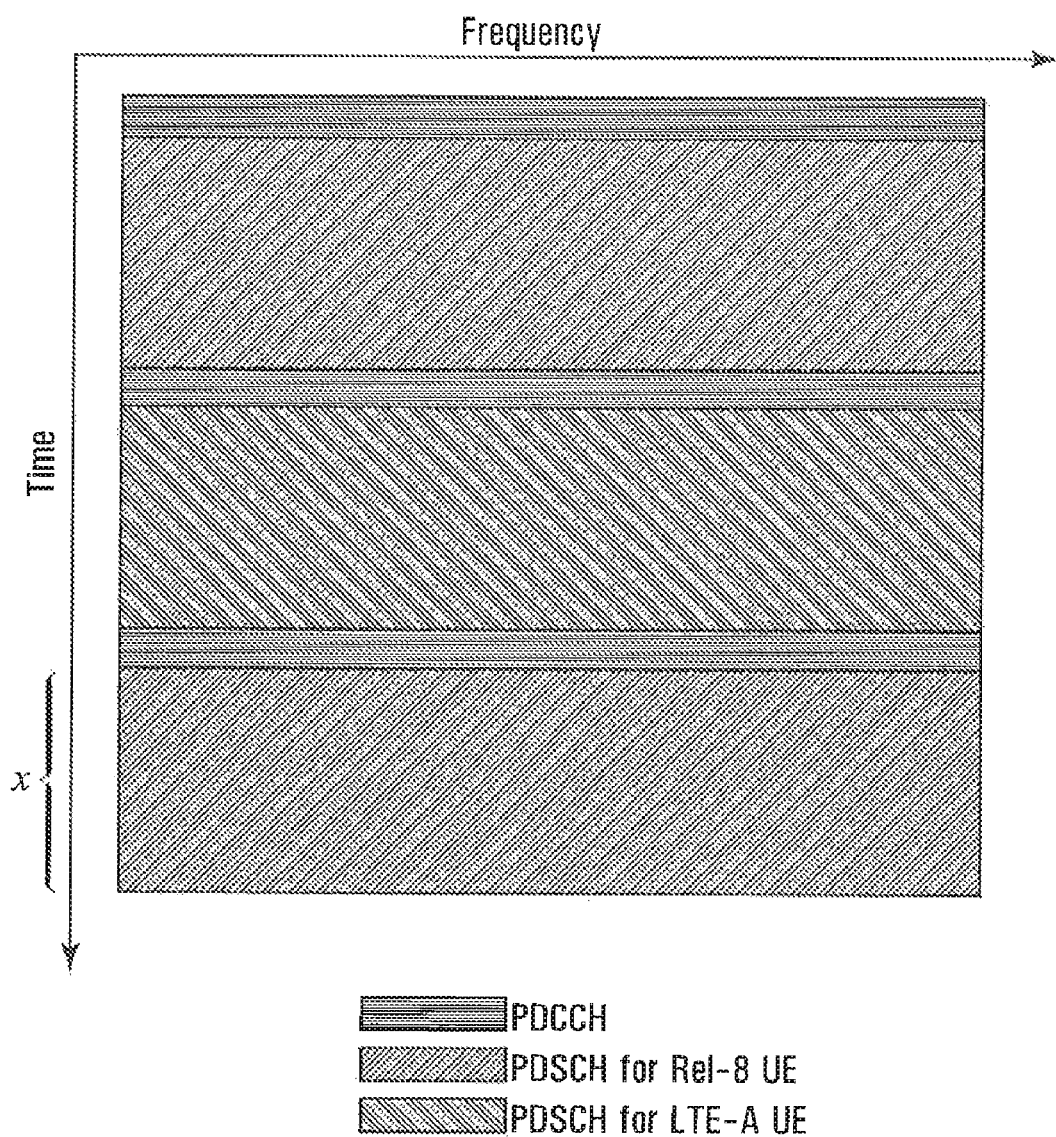
Figure 8B:
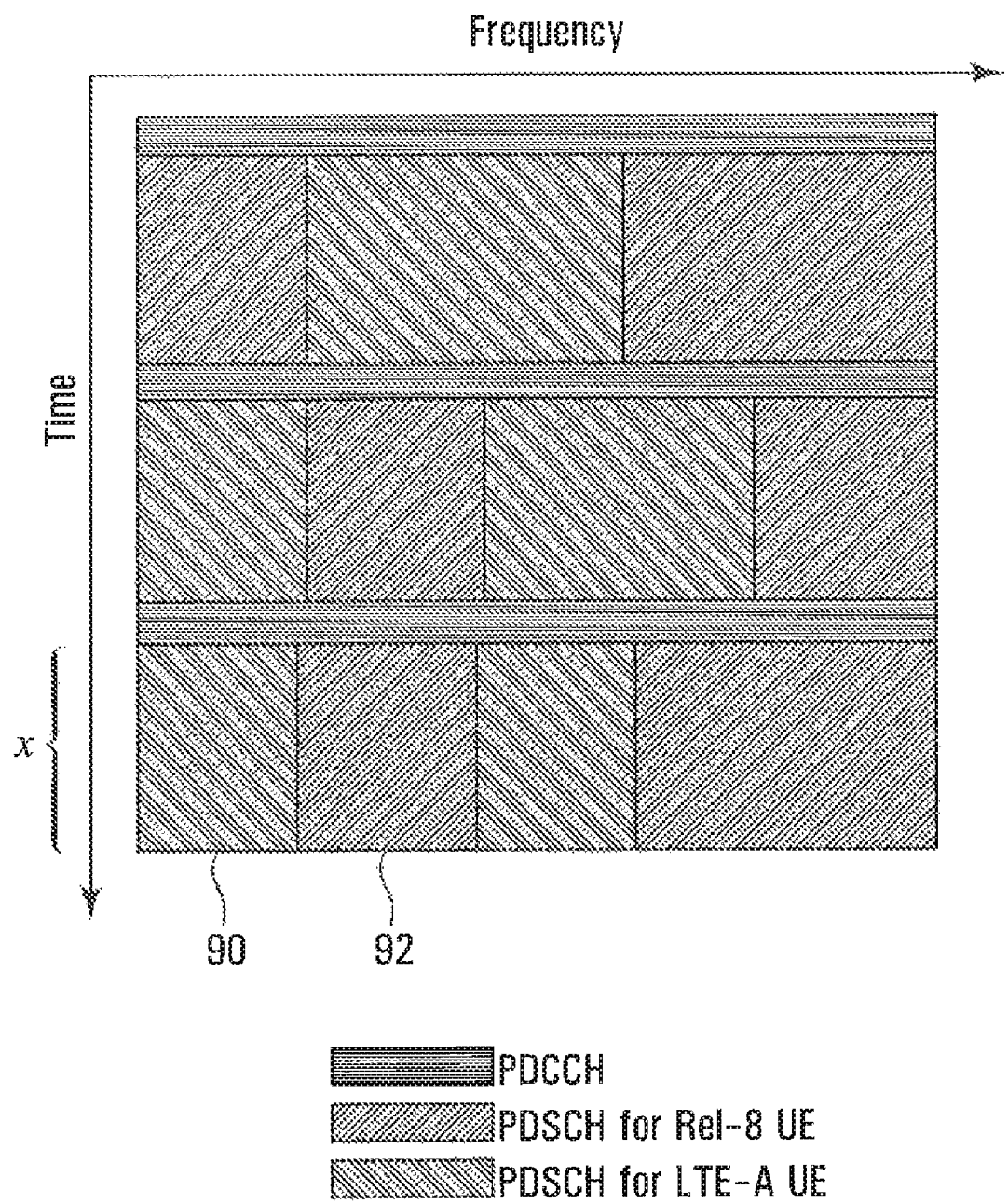
Figure 9A:
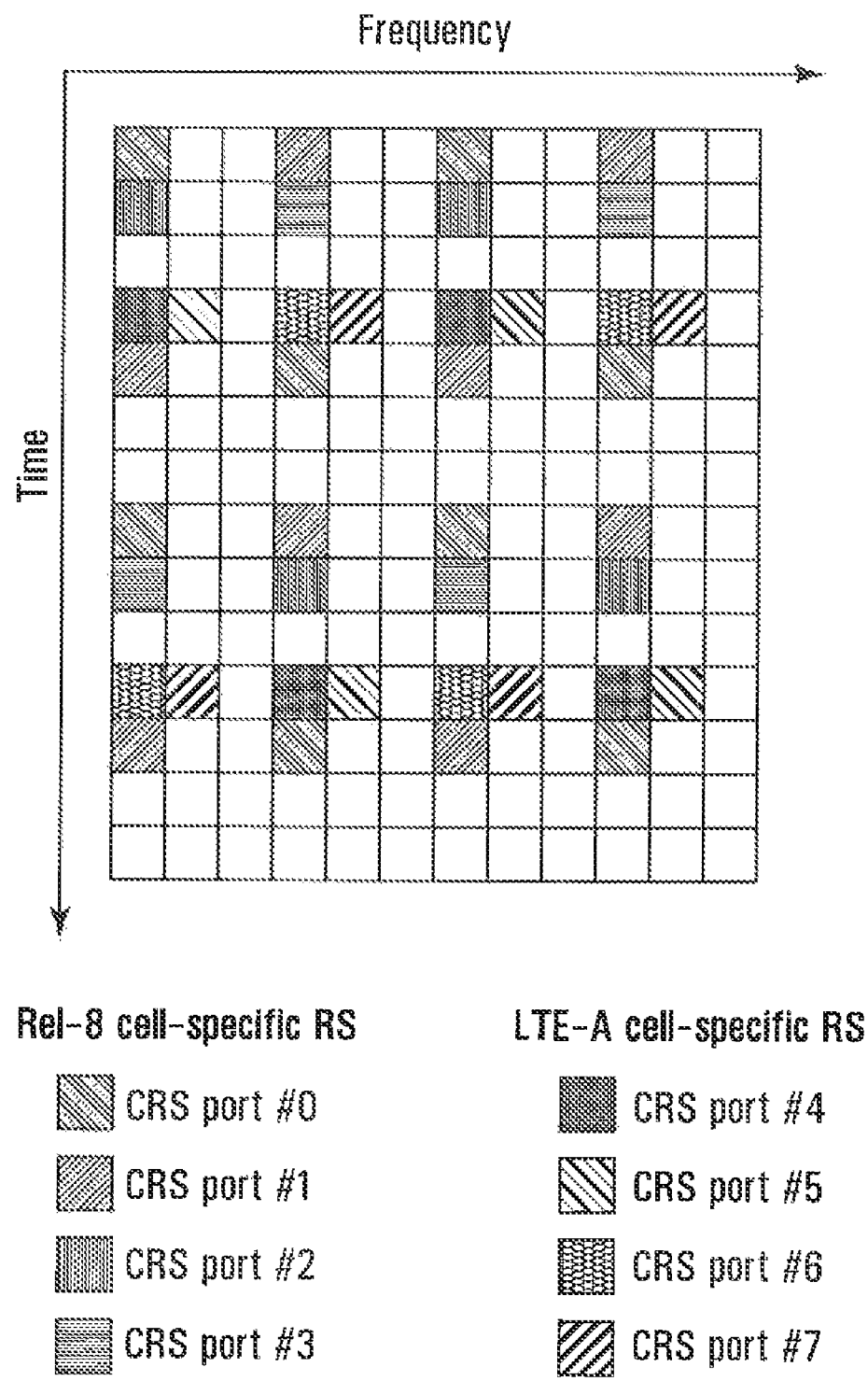
Figure 9B:
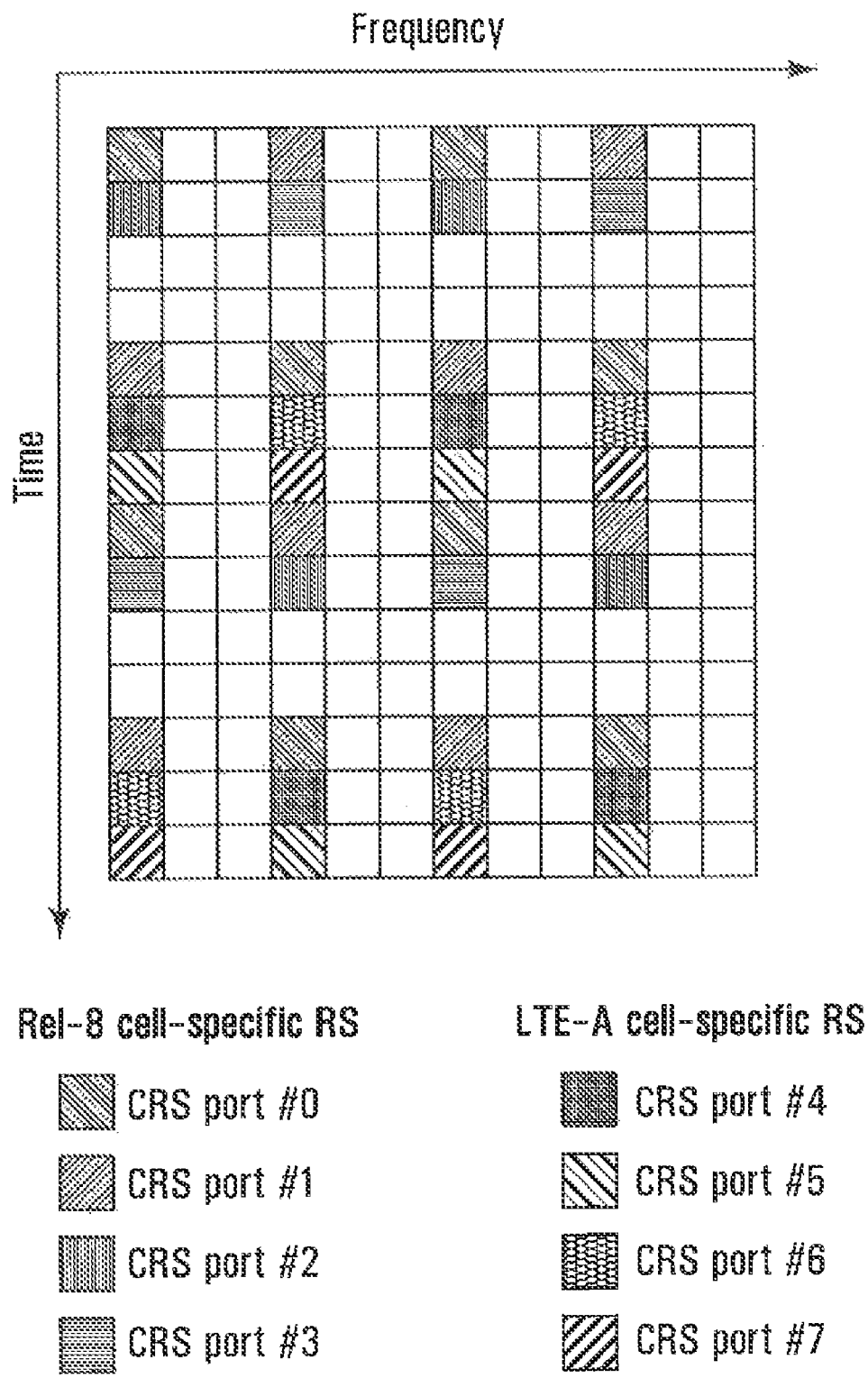
Figure 10A:
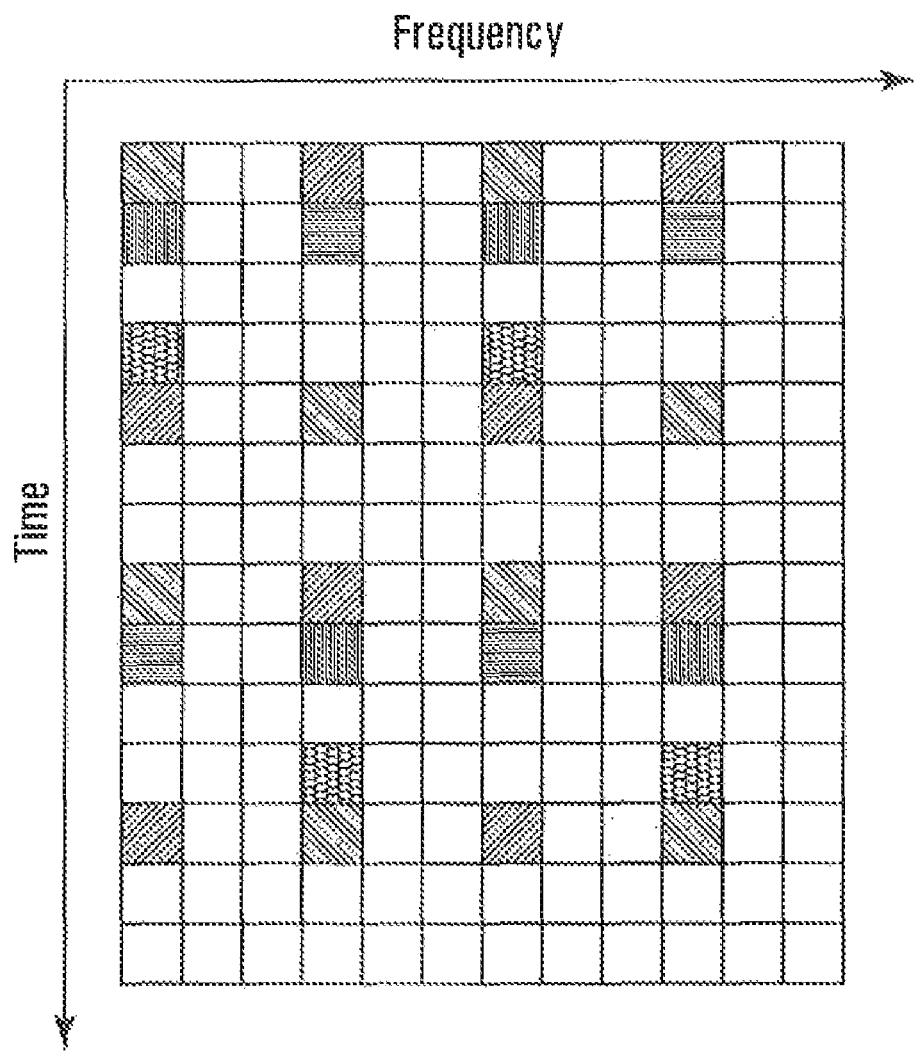
Figure 10B:
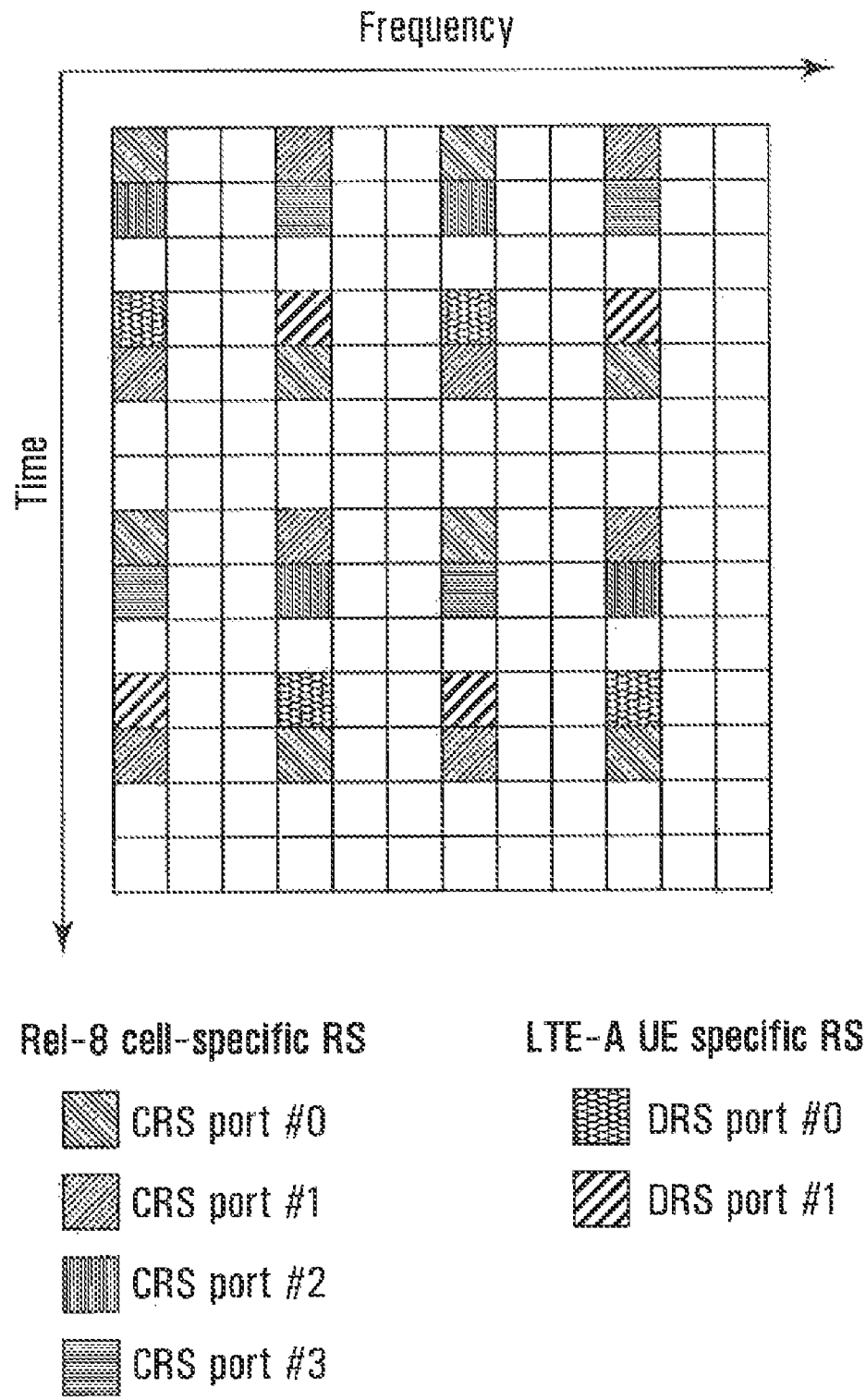
Figure 11:
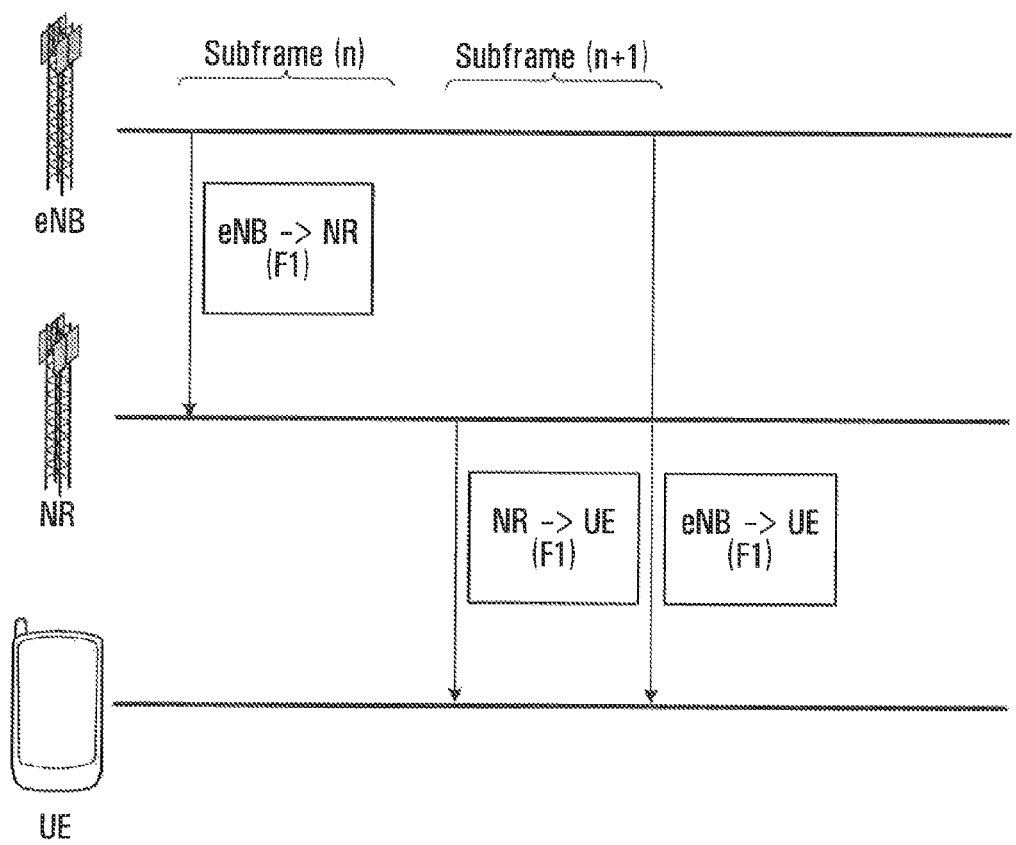
Figure 12A:
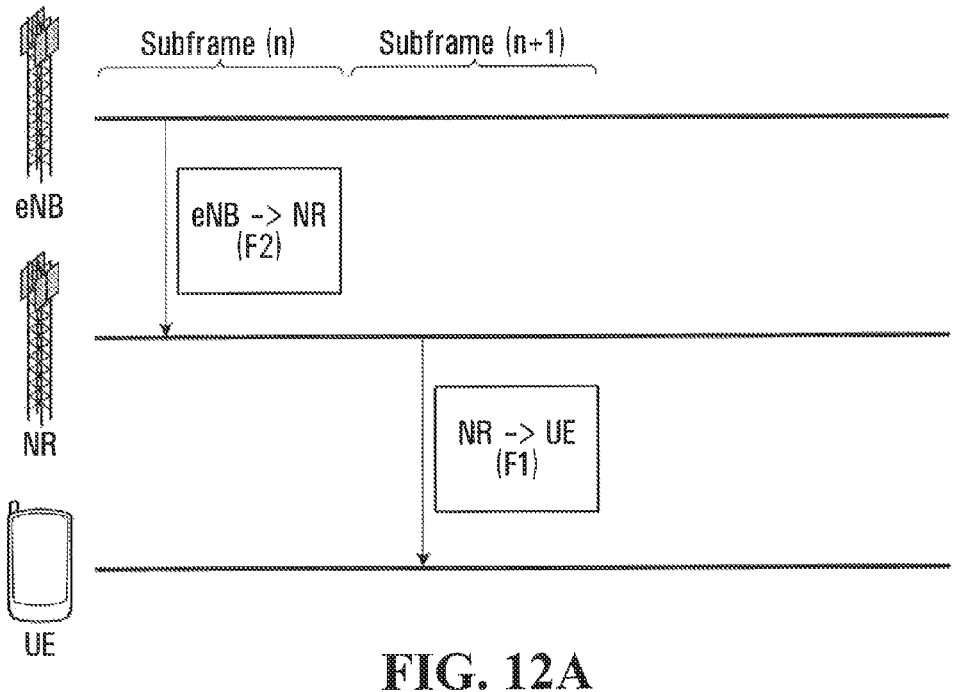
Figure 12B:
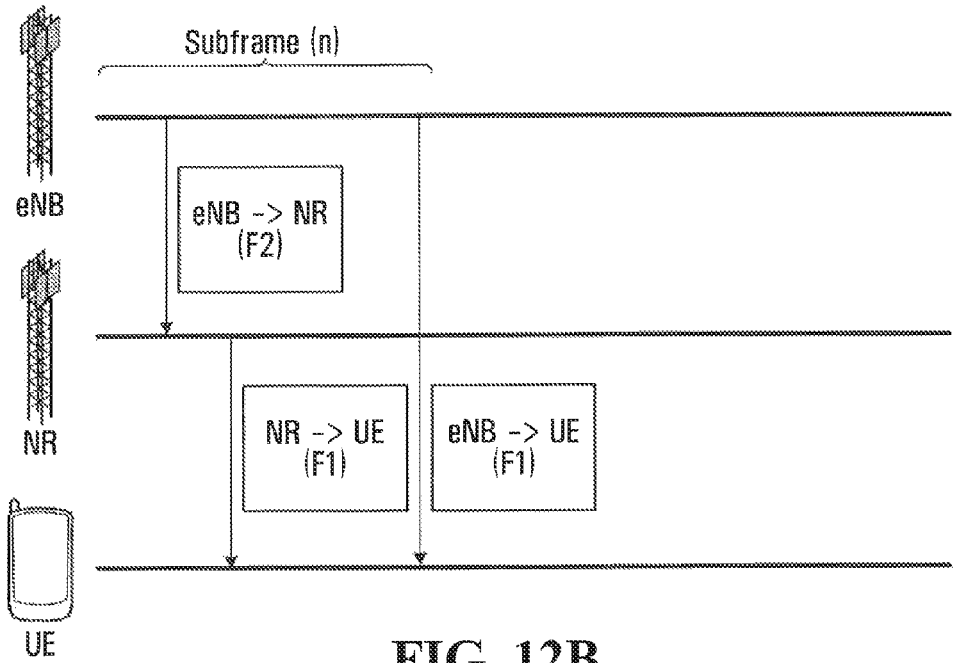

FIG, 2 is a block diagram of an example base station that might be used to implement some embodiments of the present application;

FIG. 3 is a block diagram of an example wireless terminal that might be used to implement some embodiments of the present application;

FIG. 4 is a block diagram of an example relay station that might be used to implement some embodiments of the present application;

FIG. 5 is a block diagram of a logical breakdown of an example OFDM transmitter architecture that might be used to implement some embodiments of the present application;

FIG. 6 is a block diagram of a logical breakdown of an example OFDM receiver architecture that might be used to implement some embodiments of the present application;

FIGS. 7A and 7B are examples SC-FDMA transmitter and receiver for single-in single-out (SISO) configuration provided in accordance with one embodiment of the present application;

FIG. 8A is a schematic diagram of an exemplary multiplexing technique for an information channel in accordance with an embodiment of the present application;

FIG. 8B is a schematic diagram of another exemplary multiplexing technique for an information channel in accordance with another embodiment of the present application;

FIG. 9A is a schematic diagram of an exemplary multiplexing technique for additional common reference signals in accordance with an embodiment of the present application;

FIG. 9B is a schematic diagram of another exemplary design for additional common reference signals in accordance with an embodiment of the present application;

FIG. 10A is a schematic diagram of an exemplary design for dedicated reference signals in accordance with an embodiment of the present application; and FIG. 10B is a schematic diagram of another exemplary design for dedicated reference signals in accordance with an embodiment of the present application; and FIG. 11 shows a flow diagram illustrating the steps for a DL HARQ retransmission;

FIG. 12A illustrates another example DL HARQ retransmission scheme in accordance with embodiments of the present application; and FIG. 12B illustrates yet another example DL HARQ retransmission scheme in accordance with embodiments of the present application.

Like reference numerals are used in different figures to denote similar elements.

DETAILED DESCRIPTION OF THE DRAWINGS

Wireless System Overview

Figure 1:
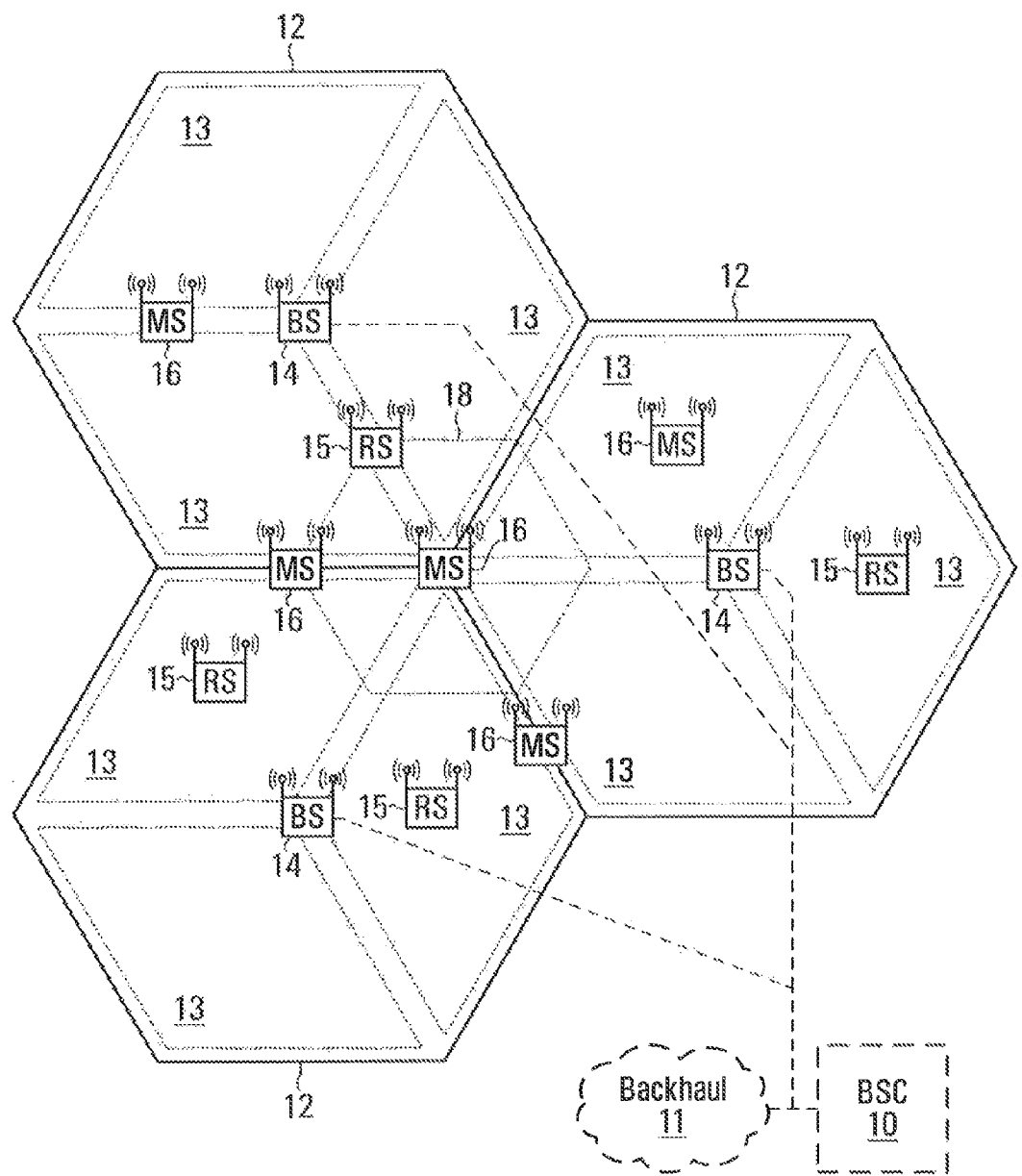
FIG. 1 is a block diagram of a cellular communication system.

Referring to the drawings, FIG. 1 shows a base station controller (BSC) 10 which controls wireless communications within multiple cells 12, which cells are served by corresponding base stations (BS) 14. In some configurations, each cell is further divided into multiple sectors 13 or zones (not shown). In general, each base station 14 facilitates communications using OFDM with mobile and/or wireless terminals 16, which are within the cell 12 associated with the corresponding base station 14. The movement of the mobile terminals 16 in relation to the base stations 14 results in significant fluctuation in channel conditions. As illustrated, the base stations 14 and mobile terminals 16 may include multiple antennas to provide spatial diversity for communications. In some configurations, relay stations 15 may assist in communications between base stations 14 and wireless terminals 16. Wireless terminals 16 can he handed off 18 from any cell 12, sector 13, zone (not shown), base station 14 or relay 15 to an other cell 12, sector 13, zone (not shown), base station 14 or relay 15. In some configurations, base stations 14 communicate with each and with another network (such as a core network or the internet, both not shown) over a backhaul network 11. In some configurations, a base station controller 10 is not needed.

Figure 2:
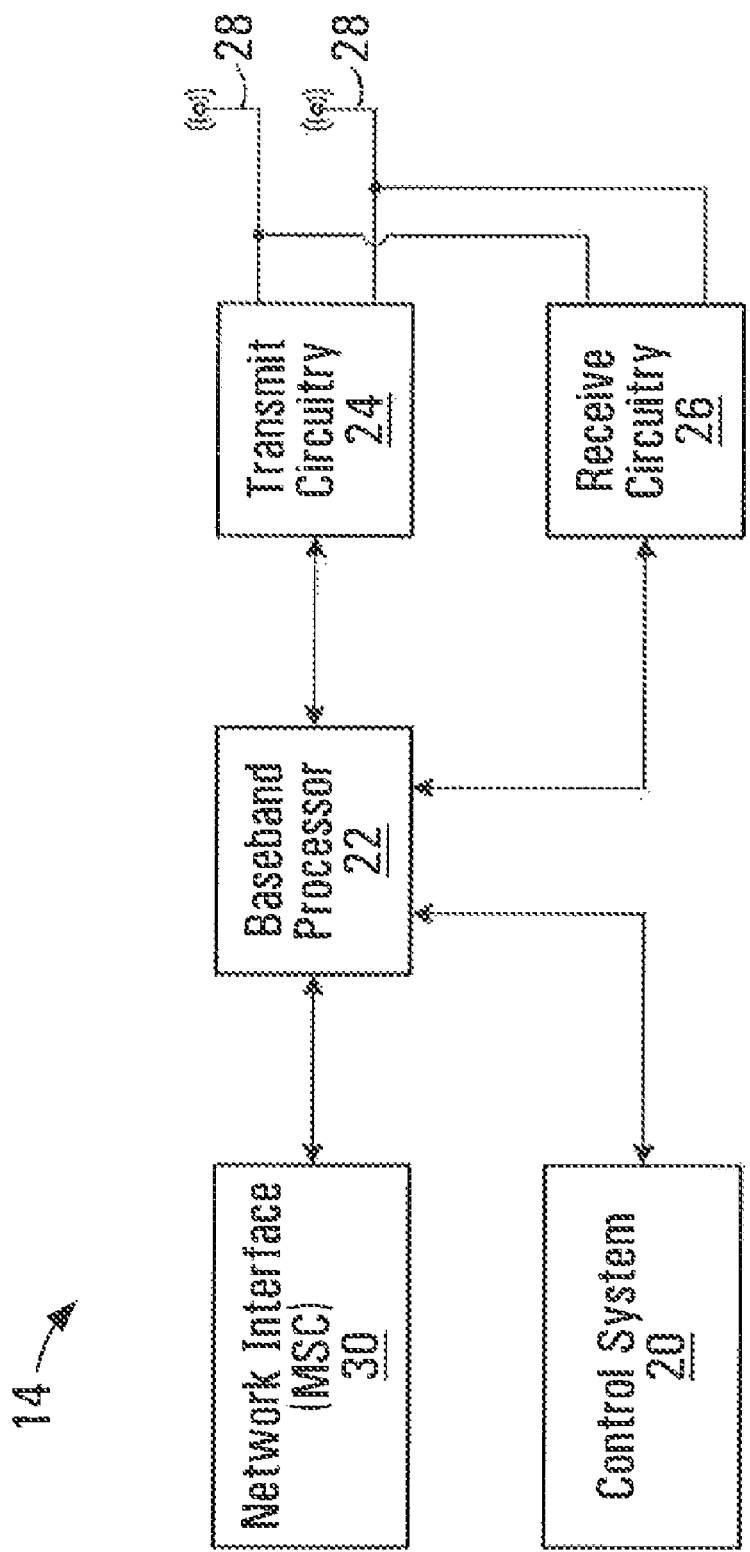

With reference to FIG. 2, an example of a base station 14 is illustrated. The base station 14 generally includes a control system 20, a baseband processor 22, transmit circuitry 24, receive circuitry 26, multiple antennas 28, and a network interface 30. The receive circuitry 26 receives radio frequency signals bearing information from one or more remote transmitters provided by mobile terminals 16 (illustrated in MG. 3) and relay stations 15 (illustrated in FIG. 4). A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 22 processes the digitized received signal to extract the information or data bits conveyed in the received signal. This processing typically comprises demodulation, decoding, and error correction operations. As such, the baseband processor 22 is generally implemented in one or more digital signal processors (DSPs) or application-specific integrated circuits (ASICs). The received information is then sent across a wireless network via the network interface 30 or transmitted to another mobile terminal 16 serviced by the base station 14, either directly or with the assistance of a relay 15.

On the transmit side, the baseband processor 22 receives digitized data, which may represent voice, data, or control information, from the network interface 30 under the control of control system 20, and encodes the data for transmission. The encoded data is output to the transmit circuitry 24, where it is modulated by one or more carrier signals having a desired transmit frequency or frequencies. A power amplifier (not shown) will amplify the modulated carrier signals to a level appropriate for transmission, and deliver the modulated carrier signals to the antennas 28 through a matching network (not shown). Modulation and processing details are described in greater detail below.

With reference to FIG. 3, an example of a mobile terminal 16 is illustrated. Similarly to the base station 14, the mobile terminal 16 will include a control system 32, a baseband processor 34, transmit circuitry 36, receive circuitry 38, multiple antennas 40, and user interface circuitry 42. The receive circuitry 38 receives radio frequency signals bearing information from one or more base stations 14 and relays 15. A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 34 processes the digitized received signal to extract the information or data bits conveyed in the received signal. This processing typically comprises demodulation, decoding, and error correction operations. The baseband processor 34 is generally implemented in one or more digital signal processors (DSPs) and application specific integrated circuits (ASICs).

For transmission, the baseband processor 34 receives digitized data, which may represent voice, video, data, or control information, from the control system 32, which it encodes for transmission. The encoded data is output to the transmit circuitry 36, where it is used by a modulator to modulate one or more carrier signals that is at a desired transmit frequency or frequencies. A power amplifier (not shown) will amplify the modulated carrier signals to a level appropriate for transmission, and deliver the modulated carrier signal to the antennas 40 through a matching network (not shown). Various modulation and processing techniques available to those skilled in the art are used for signal transmission between the mobile terminal and the base station, either directly or via the relay station.

In OFDM modulation, the transmission band is divided into multiple, orthogonal carrier waves. Each carrier wave is modulated according to the digital data to be transmitted. Because OFDM divides the transmission band into multiple carriers, the bandwidth per carrier decreases and the modulation time per carrier increases. Since the multiple carriers are transmitted in parallel, the transmission rate for the digital data, or symbols, on any given carrier is lower than when a single carrier is used.

OFDM modulation utilizes the performance of an Inverse Fast Fourier Transform (IFFT) on the information to be transmitted. For demodulation, the performance of a Fast Fourier Transform (FFT) on the received signal recovers the transmitted information. In practice, the IFFT and FFT are provided by digital signal processing carrying out an Inverse Discrete Fourier Transform (IDFF) and Discrete Fourier Transform (DFT), respectively. Accordingly, the characterizing feature of OFDM modulation is that orthogonal carrier waves are generated for multiple bands within a transmission channel. The modulated signals are digital signals having a relatively low transmission rate and capable of staying within their respective bands. The individual carrier waves are not modulated directly by the digital signals. Instead, all carrier waves are modulated at once by IFFT processing.

In operation, OFDM is preferably used for at least downlink transmission from the base stations 14 to the mobile terminals 16. Each base station 14 is equipped with "n" transmit antennas 28 (n>=1), and each mobile terminal 16 is equipped with "m" receive antennas 40 (m>=1). Notably, the respective antennas can be used for reception and transmission using appropriate duplexers or switches and are so labelled only for clarity.

When relay stations 15 are used, OFDM is preferably used for downlink transmission from the base stations 14 to the relays 15 and from relay stations 15 to the mobile terminals 16.

With reference to FIG. 4, an example of a relay station 15 is illustrated. Similarly to the base station 14, and the mobile terminal 16, the relay station 15 will include a control system 132, a baseband processor 134, transmit circuitry 136, receive circuitry 138, multiple antennas 130, and relay circuitry 142. The relay circuitry 142 enables the relay 14 to assist in communications between a base station 16 and mobile terminals 16. The receive circuitry 138 receives radio frequency signals bearing information from one or more base stations 14 and mobile terminals 16. A low noise amplifier and a filter (not shown) may cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 134 processes the digitized received signal to extract the information or data bits conveyed in the received signal. This processing typically comprises demodulation, decoding, and error correction operations. The baseband processor 134 is generally implemented in one or more digital signal processors (DSPs) and application specific integrated circuits (ASICs).

For transmission, the baseband processor 134 receives digitized data, which may represent voice, video, data, or control information, from the control system 132, which it encodes for transmission. The encoded data is output to the transmit circuitry 136, where it is used by a modulator to modulate one or more carrier signals that is at a desired transmit frequency or frequencies. A power amplifier (not shown) will amplify the modulated carrier signals to a level appropriate for transmission, and deliver the modulated carrier signal to the antennas 130 through a matching network (not shown). Various modulation and processing techniques available to those skilled in the art are used for signal transmission between the mobile terminal and the base station, either directly or indirectly via a relay station, as described above.

With reference to FIG. 5, a logical OFDM transmission architecture will be described. Initially, the base station controller 10 will send data to be transmitted to various mobile terminals 16 to the base station 14, either directly or with the assistance of a relay station 15. The base station 14 may use the channel quality indicators (CQIs) associated with the mobile terminals to schedule the data for transmission as well as select appropriate coding and modulation for transmitting the scheduled data. The CQIs may be directly from the mobile terminals 16 or determined at the base station 14 based on information provided by the mobile terminals 16. In either case, the CQI for each mobile terminal 16 is a function of the degree to which the channel amplitude. (or response) varies across the OFDM frequency band.

Scheduled data 44, which is a stream of bits, is scrambled in a manner reducing the peak-to-average power ratio associated with the data using data scrambling logic 46. A cyclic redundancy check (CRC) for the scrambled data is determined and appended to the scrambled data using CRC adding logic 48. Next, channel coding is performed using channel encoder logic 50 to effectively add redundancy to the data to facilitate recovery and error correction at the mobile terminal 16. Again, the channel coding for a particular mobile terminal 16 is based on the CQI. In some implementations, the channel encoder logic 50 uses known Turbo encoding techniques. The encoded data is then processed by rate matching logic 52 to compensate for the data expansion is associated with encoding.

Bit interleaver logic 54 systematically reorders the bits in the encoded data to minimize the loss of consecutive data bits. The resultant data bits are systematically mapped into corresponding symbols depending on the chosen baseband modulation by mapping logic 56. Preferably, Quadrature Amplitude Modulation (QAM) or Quadrature Phase Shift Key (QPSK) modulation is used. The degree of modulation is preferably chosen based on the CQI for the particular mobile terminal. The symbols may be systematically reordered to further bolster the immunity of the transmitted signal to periodic data loss caused by frequency selective fading using symbol. interleaver logic 58.

At this point, groups of bits have been mapped into symbols representing locations in an amplitude and phase constellation. When spatial diversity is desired, blocks of symbols are then processed by space-time block code (STC) encoder logic 60, which modifies the symbols in a fashion making the transmitted signals more resistant to interference and more readily decoded at a mobile terminal 16. The STC encoder logic 60 will process the incoming symbols and provide "n" outputs corresponding to the number of transmit antennas 28 for the base station 14. The control system 20 and/or baseband processor 22 as described above with respect to FIG. 5 will provide a mapping control signal to control STC encoding. At this point, assume the symbols for the "n" outputs are representative of the data to be transmitted and capable of being recovered by the mobile terminal 16.

For the present example, assume the base station 14 has two antennas 28 (n=2) and the STC encoder logic 60 provides two output streams of symbols. Accordingly, each of the symbol streams output by the STC encoder logic 60 is sent to a corresponding 1FFT processor 62, illustrated separately for ease of understanding. Those skilled in the art will recognize that one or more processors may be used to provide such digital signal processing, alone or in combination with other processing described herein. The IFFT processors 62 will preferably operate on the respective symbols to provide an inverse Fourier Transform. The output of the IFFT processors 62 provides symbols in the time domain. The time domain symbols are grouped into frames, which are associated with a prefix by prefix insertion logic 64. Each of the resultant signals is up-converted in the digital domain to an intermediate frequency and converted to an analog signal via the corresponding digital up-conversion (DUC) and digital-to-analog (D/A) conversion circuitry 66. The resultant (analog) signals are then simultaneously modulated at the desired RE frequency, amplified, and transmitted via the RF circuitry 68 and antennas 28. Notably, pilot signals known by the intended mobile terminal 16 are scattered among the sub-carriers. The mobile terminal 16, which is discussed in detail below, will use the pilot signals for channel estimation.

Reference is now made to FIG. 6 to illustrate reception of the transmitted signals by a mobile terminal 16, either directly from base station 14 or with the assistance of relay 15. Upon arrival of the transmitted signals at each of the antennas 40 of the mobile terminal 16, the respective signals are demodulated and amplified by corresponding RF circuitry 70. For the sake of conciseness and clarity, only one of the two receive paths is described and illustrated in detail. Analog-to-digital (A/D) converter and down-conversion circuitry 72 digitizes and downconverts the analog signal for digital processing. The resultant digitized signal may be used by automatic gain control circuitry (AGC) 74 to control the gain of the amplifiers in the RF circuitry 70 based on the received signal level.

Initially, the digitized signal is provided to synchronization logic 76, which includes coarse synchronization logic 78, which buffers several OFDM symbols and calculates an autocorrelation between the two successive OFDM symbols. A resultant time index corresponding to the maximum of the correlation result determines a fine synchronization search window, which is used by fine synchronization logic 80 to determine a precise framing starting position based on the headers. The output of the fine synchronization logic 80 facilitates frame acquisition by frame alignment logic 84. Proper framing alignment is important so that subsequent FFT processing provides an accurate conversion from the time domain to the frequency domain. The fine synchronization algorithm is based on the correlation between the received pilot signals carried by the headers and a local copy of the known pilot data. Once frame alignment acquisition occurs, the prefix of the OFDM symbol is removed with prefix removal logic 86 and resultant samples are sent to frequency offset correction logic 88, which compensates for the system frequency offset caused by the unmatched local. oscillators in the transmitter and the receiver. Preferably, the synchronization logic 76 includes frequency offset and clock estimation logic 82, which is based on the headers to help estimate such effects on the transmitted signal and provide those estimations to the correction logic 88 to properly process OFDM symbols.

At this point, the OFDM symbols in the time domain are ready for conversion to the frequency domain using FFT processing logic 90. The results are frequency domain symbols, which are sent to processing logic 92. The processing logic 92 extracts the scattered pilot signal using scattered pilot extraction logic 94, determines a channel estimate based on the extracted pilot signal using channel estimation logic 96, and provides channel responses for all sub-carriers using channel reconstruction logic 98. In order to determine a channel response for each of the sub-carriers, the pilot signal is essentially multiple pilot symbols that are scattered among the data symbols throughout the OFDM sub-carriers in a known pattern in both time and frequency Continuing with FIG. 6, the processing logic compares the received pilot symbols with the pilot symbols that are expected in certain sub-carriers at certain times to determine a channel response for the sub-carriers in which pilot symbols were transmitted. The results are interpolated to estimate a channel response for most, if not all, of the remaining sub-carriers for which pilot symbols were not provided. The actual and interpolated channel responses are used to estimate an overall channel response, which includes the channel responses for most, if not all, of the sub-carriers in the OFDM channel.

The frequency domain symbols and channel reconstruction information, which are derived from the channel responses for each receive path are provided to an STC decoder 100, which provides STC decoding on both received paths to recover the transmitted symbols. The channel reconstruction information provides equalization information to the STC decoder 100 sufficient to remove the effects of the transmission channel when processing the respective frequency domain symbols.

The recovered symbols are placed back in order using symbol de-interleaver logic 102, which corresponds to the symbol interleaver logic 58 of the transmitter. The de-interleaved symbols are then demodulated or de-mapped to a corresponding bitstream using de-mapping logic 104. The bits are then de-interleaved using bit de-interleaver logic 106, which corresponds to the hit interleave/logic 54 of the transmitter architecture. The de-interleaved bits are then processed by rate de-matching logic 108 and presented to channel decoder logic 110 to recover the initially scrambled data and the CRC checksum. Accordingly, CRC logic 112 removes the CRC checksum, checks the scrambled data in traditional fashion, and provides it to the de-scrambling logic 114 for de-scrambling using the known base station de-scrambling code to recover the originally transmitted data 116.

In parallel to recovering the data 116, a CQI, or at least information sufficient to create a CQI at the base station 14, is determined and transmitted to the base station 14. As noted above, the CQI may be a function of the carrier-to-interference ratio (CR), as well as the degree to which the channel response varies across the various sub-carriers in the OFDM frequency band. For this embodiment, the channel gain for each sub-carrier in the OFDM frequency band being used to transmit information is compared relative, to one another to determine the degree to which the channel gain varies across the OFDM frequency band. Although numerous techniques are available to measure the degree of variation, one technique is to calculate the standard deviation of the channel gain for each sub-carrier throughout the OFDM frequency band being used to transmit data.

Referring to FIG. 7, an example SC-FDMA transmitter 7(a) and receiver 7(b) for single-in single-out (SISO) configuration is illustrated provided in accordance with one embodiment of the is present application. In SISO, mobile stations transmit on one antenna and base stations and/or relay stations receive on one antenna. FIG. 7 illustrates the basic signal processing steps needed at the transmitter and receiver for the LTE SC-FDMA uplink. In some embodiments, SC-FDMA. (Single-Carrier Frequency Division Multiple Access) is used. SC-FDMA is a modulation and multiple access scheme introduced for the uplink of 3GPP Long Term Evolution (LTE) broadband wireless fourth generation (4G) air interface standards, and the like. SC-FDMA can be viewed as a DFI pre-coded OFDMA scheme, or, it can be viewed as a single carrier (SC) multiple access scheme. There are several similarities in the overall transceiver processing of SC-FDMA and OFDMA. Those common aspects between OFDMA and SC-FDMA are illustrated in the OFDMA TRANSMIT CIRCUITRY and OFDMA RECEIVE CIRCUITRY, as they would be obvious to a person having ordinary skill in the art in view of the present specification. SC-FDMA is distinctly different from OFDMA because of the DFT pre-coding of the modulated symbols, and the corresponding IDFT of the demodulated symbols. Because of this pre-coding, the SC-FDMA sub-carriers are not independently modulated as in the case of the OFDMA sub-carriers. As a result, PAPR of SC-FDMA signal is lower than the PAPR of OFDMA signal. Lower PAPR greatly benefits the mobile terminal in terms of transmit power efficiency.

FIGS. 1 to 7 provide one specific example of a communication system that could be used to implement embodiments of the application. It is to he understood that embodiments of the application can be implemented with communications systems having architectures that are different than the specific example, but that operate in a manner consistent with the implementation of the embodiments as described herein.

Introduction
  Large number of transmit antennas (larger than 4) could be deployed at eNB in LTE-advanced system
    These transmit antennas are less correlated and therefore be able to support single site high order MIMO (up to 8×8) in LTE-A downlink to enhance the spectrum efficiency
  Coordinated multi-point transmission and reception could also be supported in LTE-A system
    Coordinated multi-point transmission and reception could be formed from different scenarios
      From same eNB
      From different eNB
      Between eNB and NR (node of relay)
      Between different NR
    To exploit the benefit of macro diversity and multiple user transmission
    To increase cell-edge throughput by reducing inter-cell interference, or converting inter-cell interference into beneficial signal Issues
  A number of issues arises when these new features are deployed in LTE-A system
    The backward compatibility and impact of supporting Rel-8 legacy UE
    The complexity of the system at both eNB and UE
    The overhead introduced in both uplink and downlink
    These issues should be carefully considered in the designs for introducing such new features
  The issues to support high order MIMO in downlink
    The reference signal design
      Should provide good channel measurement/estimation in order to maintain performance of high order MIMO
      Should bring manageable overhead
    High order transmit diversity
      The need of high order transmit diversity should be carefully considered especially for control channel such as PDCCH, based on performance gain and overhead
    Support of Rel-8 UE
      The antenna mappings to support Rel-8 legacy UE
    Multiplexing of LTE-A UE and Rel-8 UE
      Supporting both LTE-A UE and Rel-8 UE requires multiplexing both LTE-A and Rel-8 UEs together.
    Should consider the impact to the system, especially to legacy UE, the latency, overhead etc.
  The issues to support coordinated multi-point transmission and reception
    The reference signal from multi-points should be orthogonal to each other
      Reuse the current common RS from different eNB with frequency shift
      Or design a new set of RS
    Data and channel information sharing between multi-points
    Channel information feedback from UE
    Control signal design
    The RS designs to allow coordinated multi-point transmission between node of relays (NR) and between NR and eNB Related Art
  High order MIMO like 8×8 and coordinated multi-point transmissions are new technieques Not seen in any previous standard and deployed in wireless commercial system.

Some latest proposals include
- To spread the reference signal of those additional antennas (over these Rel-8 antennas) across the whole bandwidth [1]
- [1] R1-083224, Motorola, "Common Reference Symbol Mapping/Signaling for 8 Transmit Antennas", Jeju, Korea, August 2008

Embodiment-1: Number of Transmit Antennas for Control Channel

In a LTE-A system with more than 4 transmit antenna at eNB, downlink control signals shall be transmitted using transmit diversity assuming up to 4-tx.
- The gain of using more than 4-tx transmit diversity is marginal
  - The overhead, of additional reference signal in control region for antennas>4-tx is large and not justified for its gain
- Common transmit diversity scheme for LTE-A UE and rel 8 UE
  - Keep 4-tx transmit diversity for PDCCH make current PDCCH channel work for both LTE-A UE and Rel-8 UE without any modification
- No additional common RS is transmitted in the control region other than those defined in Rel-8 to save the overhead in control region Embodiment-2: Virtual Antenna Mapping Virtual antenna mapping can be used in a LTE-A system with more than 4 transmit antennas at eNB
- The system could maintain minimal number of common RS ports (for example 4) for decoding of PDCCH for both LTE-A UE and Rel-8 UE
- The system could maintain minimal number of common RS ports (for example 4) for decoding PDSCH for Rel-8 legacy UE.
- Virtual antenna mapping can he configured by eNB on semi static or static basis, depends on the deployment scenario
- Additional antenna ports (>4) can be configured by eNB adaptively for different LTE-A UE to support different layer transmission.
- Virtual antenna can be realized by using fixed precoding, CDD or RE switching Embodiment-3: Resource Multiplexing for PDSCH In a LTE-A system with more than 4 transmit antennas at eNB, PDSCH resources for Rel-8 legacy UE and LTE-A UE can be multiplexed in two ways (see FIGS. 8A-8B).
- TDM: one subframe is use either for legacy UE assignment or LTE-A UE assignment
- FDM: Within the same subframe, different RBs could be assigned for legacy UE and LTE-A UE, simultaneously.
  - Additional RS (>4-tx) to support high order MIMO are limited in the resources assigned to LTE-A In some scenarios, FDM multiplexing is preferable due to the following reasons
- No impact to legacy UE as additional RS (>4-tx) to support high order MIMO are limited in the resources assigned to LTE-A UE.
- Able to support both legacy UE and LTE-A at the same time with low latency Embodiment-4: Channel and Rank Measurements and Feedback LIE-A system with more than 4 transmit antennas, legacy CRS for 2 or 4 Tx ports can be used for COI, PMI and Rank measurement of 4 virtual Tx ports In LTE-A system with more than 4 transmit antennas, the CQI and rank variation is less compared with systems with 2-4 antenna ports.
- Lower density CRS for antenna port>4 is needed for CQI and rank measurement. The reference signals don't have to cover the Whole system bandwidth and every subframe
- Options for transmitting CRS for antenna ports>4
  - Periodic transmitting CRS for antenna for all ports and ports>4. The period of such transmission is configurable.
    - E.g., transmit them on the same subframes as PSCH/SSCH channels to allow 5 ms measurement period
  - Transmit them at certain reserved resources.

For downlink high-order MIMO, precoding can be accomplished as follows
- For FDD system, analog channel information could be measured by UE and feedback to eNB by two-way sounding. The measurement could be based on the common RS or combination of common RS and dedicated RS.
- For TDD system, channel information can be measured at eNB from uplink
  - UL RE switching may needed for less Tx RE chain than Rx RF chain.
- UE doesn't need to select and feedback rank and precoding matrix.
- eNB is responsible for rank and precoding matrix selection from the channel information it obtained.
- eNB will apply precoding to data. It could transmit additional CRS or dedicated RS for UE to decode the data.

Embodiment-5: Data Demodulation

At UE side, data decoding can be done by UE-specific dedicated RS or combined dedicated RS and legacy CRS
- Options for 1 to 4 stream transmission
  - Using 1,2 or 4 legacy CRS
  - Using 1,2 or 4 legacy CRS and one (or more) UE specific dedicated RS
    - Trade-off between overhead and performance
- For 5 or more stream transmission
  - Using legacy 1,2 or 4 CRS and additional UE specific dedicated RS
  - Using 8 CRS (4 legacy CRS and 4 additional CRS). There are two multiplexing methods:
    - 4 Additional CRS are transmitted at different subcarriers than legacy CRS
    - 4 additional CRS and legacy CRS are multiplexed by CDM Embodiment-6: RS Design for LTE-A System with >4 Transmit Antenna The reference signal design/arrangement for LTE-A system with >4 transmit antennas could follow the following guidelines:
- Maintain cell-specific common RS ports for Rel-8 (2 or 4 ports) for PDCCH or PDSCH regions where Rel-8 UE are supported
- For PDSCH regions assigned to LTE-A UE, cell-specific common RS ports for Rel-8 could he maintained.
- In PDSCH regions assigned for LTE-A UE, additional cell-specific (common) RS ports up to 4 could be configured.
- Alternatively, in PDSCH regions assigned for LTE-A UE, additional UE-specific (dedicated) RS ports could be configured. The number of such additional UE-specific RS ports could be configured by eNB on per UE basis.

It is preferable that these additional common RS or dedicated RS ports have the similar RS patterns as Ret-8 common RS.

The density of additional dedicated RS could be less than those of Rel-8 common RS due to less variation of channel in a system for high-order MIMO.

The design examples of such RS ports are illustrated in FIGS. 9A, 9B, 10A, and 10B.

Embodiment-7: RS Design for Coordinated MIMO
 RS design for three types of coordinated MIMO
  eNB and eNB coordinated MIMO
   Orthogonal RS design by time or frequency shifting RS from different eNB.
  eNB and Node of relay (NR) coordinated MIMO
   NR can use tiem or frequency shifted RS of eNodeB
   New RS pattern for NR which is orthogonal to RS of eNB
   NR can use dedicated RS for data decoding
   Reserve one or more PHICH to transmit RS for channel measurement of NR
    RS from different NRs can he CDM or FDM multiplexed on the same PHICH resource
  NR and NR coordinated MIMO
   NRs can use shifted or CDM RS
   New RS pattern for NR which is orthogonal to RS of eNB
   Reserve one or more PHICH for transmitting RS for channel measurement of NR
    RS form different NRs can be CDM or FDM multiplexed on the same reserved PHICH Key Features
 In a LTE-A system with more than 4 transmit antennas at eNB.
  Downlink control signals shall be transmitted using transmit diversity assuming up to 4-tx. No additional common RS is transmitted in the control region other than those defined in Rel-8.
  The system could maintain minimal number of cell-specific or common RS ports (for example 4)
   For decoding PDCCH for both LTE-A and Rel-8 UE
   For decoding PDSCH for Rel-8 legacy UE.
   This can be realized by using virtual antenna mapping.
  The additional RS ports could be configured as cell-specific or UE-specific. If they are configured as UE-specific or dedicated RS ports, they can be adaptively assigned/formed by eNB on per UE basis to support high-order MIMO transmission
  Virtual antenna mapping is configured by eNB on semi static or static basis, depends on the deployment scenario, channel condition or UE capability.
  Virtual antenna can be realized by using fixed precoding, CDD or RF switching
  FDM/TDM multiplexing Rel-8 UE and LTE-A UE shall be supported to accommodate both high-order MIMO and low order MIMO (Rel-8 MIMO)
  Reference signal from additional antennas or all antenna ports could be configured to transmit periodically on reserved resources for downlink channel measurements.
  eNB determines the rank and precoding matrix through channel information it obtained through UE feedback, or sounding channels for FDD and through uplink channel measurement for TDD.
  UE decode the data of high-order MIMO through cell-specific/common RS or combination of common RS and UE specific/dedicated RS.
 On RS design for coordinated MIMO
  Orthogonal RS design by time or frequency shifting RS from different eNB.
  Reserve one or more PHICH to transmit RS for channel measurement of NR.
  RS from different NRs can be CDM or FDM multiplexed on the same PHICH resource Introduction
 Transparent relay has been included as one relay mode in LTE-A TR.
 Transparent relay means that UE doesn't know whether or not it communicates with the network via the relay
 It is preferable for the transparent relay to support Rel-8
 Transparent relay can be used to improve the performance of LTE Rel-8
  Case-1: deploy in the Rel-8 network
  Case-2: deploy as one relay mode in LTE-A network to serve Rel-8 UE.

Issues
 In order to apply DL transparent relay to assist DL retransmission during HARQ, NR (Node of relay station) should be synchronized with eNB (base station) in time and frequency.
 The issues of the DL signaling for DL transparent relay:
  DL HARQ is asynchronous
   The retransmission information, such as MCS and channel resource allocation, is signaled through DL control channel (PDCCH) in the same subframe as the retransmission
  As the control signaling region and date transmission region are multiplexed contiguously in TDM fashion, there is no guard time between them
   The DL control channel (PDCCH) is transmitted in the first n (n=1,2 and 3) 1 OFDM symbols in each subframe.
   The DL data channel (PDSCH) is transmitted through the rest (N−n) OFDM symbols (N is the number of OFDM symbols in each subframe),
   It is hard for NR to switch from reception mode to transmission mode between contiguous symbols
   It is also difficult for NR to decode re-transmission information in PDCCH and prepare retransmission on PDSCH in the same subframe.
  In some situation, the number of PDCCH carried by PURE could vary from subframe to subframe, this also make it hard for NR to decode PCFICH and determine the start of PDSCH and send retransmission in the same subframe Scenario 1: In-Band DL Transparent Relay
 One solution to solve these issues is to use network-to-relay link to signal re-transmission information of re-transmission to the NR (see FIG. 11).
 This DL network-relay link could occupy the same frequency band as network-to UE access link.
 NR receives signals from eNB and transmits signals to UE in different subframes.
  eNB identifies cell edge UEs which needs the help of NR for re-transmission.
  eNB schedules the re-transmission information for these UEs one subframe ahead.
   With the help of relay, the requirement on scheduler to capture the instantaneous channel variation is eased.

eNB signals the re-transmission information through the reserved channel resource, for example, the reserved PDCCH, to NR one subframe ahead of the re-transmission New control channel format can be defined.
For example PDCCH for a group of cell edge UEs.
NR obtains re-transmission information and sends the scheduled re-transmission in the next subframe the same as eNB.

Scenario-2: Out-of-Band DL Transparent Relay
DL network-relay link and network-UE access link occupies different frequency band.
A dedicated frequency band is assigned for the link between eNB and NR.
NR receives signals from eNB and transmits signals to UE in different frequency band.
Option-1 eNB transmits the HARQ related PDCCH in subframe n and NR transmits the retransmission data to UE in subframe (n+1) (see FIG. 12A);
Option-2 eNB transmits the HARQ related PDCCH in subframe n and NR transmits the retransmission data to UE in subframe n (see FIG. 12B);
Different control channel format can be used for NR orientated PDCCH such that there are some guard time to allow NR to decade its PDCCH before sending the corresponding PDSCH.

Synchronization of NR to eNB
To make NR DL transmission synchronized to eNB, each NR needs to transmit at the time aligned with the time it detected in the DL synchronization signals.
This means that in the multi-relay scenario, each NR can transmit at a slightly different time, to make the signal arrive the served UE at the same time.
In addition, this also means that NR would have no impact to system design, e.g. length of cyclic prefix and pilot density in frequency direction.
Another way to do the relay timing adjustment:
NB measures the arrival timing difference between NR and UE
NB sends this timing offset information to NR.
NR adjusts its timing accordingly Key Features
The DL network-relay link could be used to signal re-transmission information to the NR for transparent relay.
Both inland network-relay signaling channel and outband network-relay signaling channel can be designed to signal the cell edge UE's HARQ information to NR.
For inband network-relay link, re-transmission information could be signaled to NR one subframe before its corresponding re-transmission.
For outband network-relay link, re-transmission information could be signaled to NR one subframe before or in the same subframe as its corresponding re-transmission, if in the same subframe, there should be enough guard time between reception of such control signaling and re-transmission at NR.
Different structure can be defined for network-relay link.
Inband network-relay link could use some reserved resources in PDCCH or PDSCH.

Technical Information
Brief Description of the Application:
This Application proposed a number of new designs for LTE-A system to support high-order MIMO and coordinated MIMO, they include:
In a LTE-A system with more than 4 transmit antennas at eNB.
Downlink control signals shall be transmitted using transmit diversity assuming up to 4-tx. No additional common RS is transmitted in the control region other than those defined in Rel-8.
The system could maintain minimal number of cell-specific or common RS ports (for example 4) for decoding PDCCH for both LTE-A and Rel-8 UE and for decoding PDSCH for Rel-8 legacy UE. This can be realized by using virtual antenna mapping.
The additional RS ports could be configured as cell-specific or UE-specific. If they are configured as UE-specific or dedicated RS ports, they can be adaptively assigned/formed by eNB on per UE basis to support high-order MIMO transmission
Virtual antenna mapping is configured by eNB on semi static or static basis, depends on the deployment scenario, channel condition or UE capability.
Virtual antenna can be realized by using fixed precoding, CDD or RF switching
FDM/TDM multiplexing Rel-8 UE and LTE-A UE shall be supported to accommodate both high-order MEMO and low order MIMO (Rel-8 MIMO)
Reference signal from additional antennas or all antenna ports could be configured to transmit periodically on reserved resources for downlink channel measurements.
eNB determines the rank and precoding matrix through channel information it obtained through UE feedback, or sounding channels for MD and through uplink channel measurements for TDD.
UE decode the data of high-order MIMO through cell-specific/common RS or combination of common RS and LIE specific/dedicated RS.
On RS design for coordinated MIMO
Orthogonal RS design by time or frequency shifting RS from different eNB. Reserve one or more PHICH to transmit RS for channel measurement of NR.
RS from different NRs can be CDM or FDM multiplexed on the same PHICH resource Problem Solved by the Application:
The Application solved a number of issues related to LTE-A system:
1. The order of transmit diversity for control channel
2. The antenna mapping for LTE-A system with >4 transmit antennas
3. The multiplexing of LTE-A UE and Rel-8 UE
4. The RS design for system to support high-order MIMO
5. The RS design for system to support coordinated MEMO
6. The precoding scheme for high-order MIMO system including channel measurement, rank measurement, channel feedback, RS design.

Solutions that have been tried and why they didn't work:
Other solutions include:
1. Insert additional common RS for transmit antenna>4 and spread them across the whole system band, the drawback of such proposal is large overhead.
2. Use 8-tx transmit diversity for PDCCH, which is not necessary and introduce large overhead.

Specific elements or steps that solved the problem and how they do it:
For high-order MIMO system, the Application design will work as follows:
1. Maintain Rel-8 common RS in control region (PDCCH)
2. Partition data region (PDSCH) into LTE-A and Rel-8 regions. Only transmit Rel-8 RS in Rel-8 regions.

3. In LTE-A regions, transmit either additional cell-specific common RS or UE-specific dedicated RS to support decoding of high-order MIMO
4. The downlink channel measurement is accomplished by UE and feedback to eNB through sounding channel for FDD. It could be measured by eNB from uplink cfor TDD.
5. The eNB selects the rank precoding vectors based on the channel feedback and applies precoding to data.
6. The UE decodes precoding data using common RS and dedicated RS or combination of both.

On RS design for coordinated MIMO, RS could be orthogonal among coordinated points including eNB, relay nodes etc. channel could be reused for RS from relay node for channel measurement.

Commercial value of the Application:

The high-order MIMO and coordinated MIMO could bring improved spectrum efficiency for LTE-A system.

The above-described and appended embodiments of the present application are intended to be examples only. Those of skill in the art may effect alterations, modifications and variations to the particular embodiments without departing from the scope of the application.

What is claimed is:

1. A method of operation of a MIMO transmitter, in a cellular network supporting both legacy mobile terminals and next-generation mobile terminals, said method comprising:
   identifying a plurality of resource blocks within a communication channel of said cellular network, wherein each resource block corresponds to a region of subcarriers of a transmission timeslot at a given frequency band;
   periodically transmitting a first set of reference signals (RSs) for said legacy mobile terminals at a first set of time and frequency resources within said plurality of resource blocks by said MIMO transmitter using a first period; and
   periodically transmitting a second set of RSs for said next-generation mobile terminals at a second set of time and frequency resources within said plurality of resource blocks by said MIMO transmitter using a second period, wherein the second period is configured to be different from the first period.

2. The method of claim 1, further comprising:
   transmitting a set of dedicated RSs for the next-generation mobile terminals, wherein the dedicated RSs are in a physical downlink shared channel (PDSCH) region.

3. The method of claim 2, further comprising:
   precoding the dedicated RSs using selected precoding matrices, wherein the precoding matrices are selected based at least in part on channel condition between the next-generation mobile terminals and base stations communicating with the next-generation mobile terminals.

4. The method of claim 1, further comprising:
   multiplexing data for the legacy mobile terminals and next-generation mobile terminals on a time divisional multiplex (TDM) basis.

5. The method of claim 1, further comprising:
   multiplexing data for the legacy mobile terminals and next-generation mobile terminals on a frequency divisional multiplex (FDM) basis.

6. The method of claim 1, wherein the second set of the RSs is of less density than the first set of the RSs within said plurality of resource blocks.

7. The method of claim 1, wherein the second set of the RSs occupies part of the resource blocks of the frequency band, and the first set of the RSs occupies all resource blocks of the frequency band.

8. The method of claim 1, further comprising:
   transmitting physical downlink control channel (PDCCH) signals for legacy mobile terminals and next-generation mobile terminals at a same subframe, using a maximum number of 4 transmit antennas.

9. The method of claim 8, wherein the physical downlink control channel signals for legacy mobile terminals and next-generation mobile terminals are transmitted on multiple antennas using transmit diversity.

10. The method of claim 1, wherein the legacy mobile terminals are Long Term Evolution (LTE) mobile terminals and the next-generation mobile terminals are LTE-Advanced (LTE-A) mobile terminals.

11. The method of claim 1, wherein the second period is configured to be greater than the first period.

12. A base station operating in a cellular network supporting both legacy mobile terminals and next mobile terminals, the base station configured to:
    identify a plurality of resource blocks within a communication channel of said cellular network, wherein each resource block corresponds to a region of subcarriers of a transmission timeslot at a given frequency band;
    periodically transmit a first set of reference signals (RSs) for said legacy mobile terminals at a first set of time and frequency resources within said plurality of resource blocks using a first period; and
    periodically transmit a second set of RSs for said next-generation mobile terminals at a second set of time and frequency resources within said plurality of resource blocks using a second period, wherein the second period is configured to be different from the first period.

13. The base station of claim 12, further configured to:
    transmit a set of dedicated RSs for the next-generation mobile terminals, wherein the dedicated RSs are in a physical downlink shared channel (PDSCH) region.

14. The base station of claim 13, further configured to:
    precode the dedicated RSs using selected precoding matrices, wherein the precoding matrices are selected based at least in part on channel condition between the next-generation mobile terminals and the base station.

15. The base station of claim 12, further configured to:
    multiplex data for the legacy mobile terminals and next-generation mobile terminals on a time divisional multiplex (TDM) basis.

16. The base station of claim 12, further configured to:
    multiplex data for the legacy mobile terminals and next-generation mobile terminals on a frequency divisional multiplex (FDM) basis.

17. The base station of claim 12, wherein the second set of the RSs is of less density than the first set of the RSs within said plurality of resource blocks.

18. The base station of claim 12, wherein the second set of the RSs occupies part of the resource blocks of the frequency band, and the first set of the RSs occupies all resource blocks of the frequency band.

19. The base station of claim 12, further configured to:
    transmit physical downlink control channel signals for legacy mobile terminals and next-generation mobile terminals at a same subframe, using a maximum number of 4 transmit antennas.

20. The base station of claim 19, wherein the physical downlink control channel signals for legacy mobile terminals and next-generation mobile terminals are transmitted on multiple antennas using transmit diversity.

21. The base station of claim 12, wherein the legacy mobile terminals are Long Term Evolution (LTE) mobile terminals and the next-generation mobile terminals are LTE-Advanced (LTE-A) mobile terminals.

22. The base station of claim 12, wherein the second period is configured to be greater than the first period.

* * * * *

UNITED STATES PATENT AND TRADEMARK OFFICE
CERTIFICATE OF CORRECTION

PATENT NO. : 8,315,225 B2
APPLICATION NO. : 13/068836
DATED : November 20, 2012
INVENTOR(S) : Hua Xu et al.

It is certified that error appears in the above-identified patent and that said Letters Patent is hereby corrected as shown below:

In the Specification:

On the Title Page, Item (54), and in column 1, line 1, Title, before "ASPECTS", insert --DESIGN--.

On the Title Page, Item (57), in the Abstract, line 12, "by, the legacy" should read --by the legacy--.

In column 1, line 14, "to a techniques" should read --to techniques--.

In column 1, line 33, "FIG, 2" should read --FIG. 2--.

In column 1, line 49, "are examples SC-FDMA transmitter" should read --are an example SC-FDMA transmitter--.

In column 2, lines 34-35, "to an other cell" should read --to another cell--.

In column 2, line 37, "with each and" should read --with each other and--.

In column 2, line 47, "(illustrated in MG. 3)" should read --(illustrated in FIG. 3)--.

In column 3, line 46, "transmission hand" should read --transmission band--.

In column 3, line 61, "(IDFF)" should read --(IDFT)--.

In column 4, line 22, "base station 16" should read --base station 14--.

In column 4, line 44, "one or more carrier signals that is" should read --one or more carrier signals that are--.

Signed and Sealed this
Twelfth Day of February, 2013

Teresa Stanek Rea
*Acting Director of the United States Patent and Trademark Office*

CERTIFICATE OF CORRECTION (continued)

U.S. Pat. No. 8,315,225 B2

In column 4, line 66, "amplitude. (or response)" should read --amplitude (or response)--.

In column 5, line 13, "data expansion is associated" should read --data expansion associated--.

In column 5, line 26, "symbol. interleaver" should read --symbol interleaver--.

In column 5, line 46, "1FFT" should read --IFFT--.

In column 5, line 60, "desired RE" should read --desired RF--.

In column 6, lines 32-33, "local. oscillators" should read --local oscillators--.

In column 6, line 51, "frequency Continuing" should read --frequency. Continuing--.

In column 7, line 10, "hit interleave/logic" should read --bit interleaver logic--.

In column 7, line 26, "sub--carrier" should read --sub-carrier--.

In column 7, line 27, "relative, to one another" should read --relative to one another--.

In column 7, line 37, "of the is present application." should read -- of the present application.--.

In column 7, line 39, "FIG, 7" should read --FIG. 7--.

In column 7, line 42, "SC-FDMA. (Single-Carrier" should read --SC-FDMA (Single-Carrier--.

In column 7, line 47, "as a DFI" should read --as a DFT--.

In column 7, line 65, "to he understood" should read --to be understood--.

In column 8, lines 6-7, "therefore be able" should read --therefore able--.

In column 8, line 55, "Reuse" should read --Re-use--.

In column 8, line 67, "technieques" should read --techniques--.

In column 9, line 12, "4 transmit antenna" should read --4 transmit antennas--.

In column 9, line 17, "overhead, of additional" should read --overhead of additional--.

In column 9, line 21, "rel 8 UE" should read --Rel-8 UE--.

CERTIFICATE OF CORRECTION (continued)

In column 9, line 37, "can he configured" should read --can be configured--.

In column 9, line 44, "RE switching" should read --RF switching--.

In column 9, line 47, "ReI-8 legacy" should read --Rel-8 legacy--.

In column 9, line 49, "is use" should read --is used--.

In column 9, line 55, "assigned to LTE-A" should read --assigned to LTE-A UE.--.

In column 9, line 65, "LIE-A system" should read --In LTE-A system--.

In column 9, line 66, "COI," should read --CQI,--.

In column 10, line 6, "the Whole system" should read --the whole system--.

In column 10, line 26, "RE switching may needed for less Tx RE chain" should read --RF switching may be needed for less Tx RF chain--.

In column 10, line 39, "1 to 4 stream transmission" should read --1 to 4 stream transmissions--.

In column 10, line 44, "5 or more stream transmission" should read --5 or more stream transmissions--.

In column 10, line 62, "could he maintained." should read --could be maintained.--.

In column 11, line 6, "Ret-8" should read --Rel-8--.

In column 11, line 18, "use tiem" should read --use time--.

In column 11, line 24, "can he CDM" should read --can be CDM--.

In column 12, line 17, "to support Rel-8" should read --to support Rel-8 UE.--.

In column 12, line 19, "LTE Rel-8" should read --LTE Rel-8 UE:--.

In column 12, line 48, "In some situation," should read --In some situations,--.

In column 12, line 49, "PURE could vary" should read --PCFICH could vary--.

In column 12, line 50, "also make it hard" should read --also makes it hard--.

In column 12, line 61, "UEs which needs" should read --UEs which need--.

CERTIFICATE OF CORRECTION (continued)

In column 13, line 25, "decade" should read --decode--.

In column 13, line 46, "inland network-relay" should read --inband network-relay--.

In column 13, lines 54-55, "re-transmission, if in the same" should read --re-transmission. If in the same--.

In column 14, line 23, "MEMO" should read --MIMO--.

In column 14, line 30, "for MD" should read --for FDD--.

In column 14, line 34, "LIE specific/dedicated RS." should read --UE specific/dedicated RS.--.

In column 14, line 50, "MEMO" should read --MIMO--.

In column 15, lines 6-7, "uplink cfor TDD." should read --uplink for TDD.--.

In column 15, line 14, "nodes etc. channel" should read --nodes etc. PHICH channel--.